US008311026B2

(12) United States Patent
Kishiyama et al.

(10) Patent No.: US 8,311,026 B2
(45) Date of Patent: Nov. 13, 2012

(54) MOBILE COMMUNICATION SYSTEM, BASE STATION APPARATUS, USER APPARATUS AND METHOD

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 364 days.

(21) Appl. No.: 12/672,522

(22) PCT Filed: Aug. 12, 2008

(86) PCT No.: PCT/JP2008/064487
§ 371 (c)(1),
(2), (4) Date: Jun. 2, 2010

(87) PCT Pub. No.: WO2009/022696
PCT Pub. Date: Feb. 19, 2009

(65) Prior Publication Data
US 2012/0002613 A1 Jan. 5, 2012

(30) Foreign Application Priority Data
Aug. 14, 2007 (JP) ................................ 2007-211594

(51) Int. Cl.
*H04B 7/208* (2006.01)
*H04J 1/00* (2006.01)
(52) U.S. Cl. ......... 370/344; 370/329; 370/343; 370/319
(58) Field of Classification Search .................. 370/319, 370/329, 343, 344
See application file for complete search history.

(56) References Cited

U.S. PATENT DOCUMENTS

| | | | | |
|---|---|---|---|---|
| 5,909,436 | A | * | 6/1999 | Engstrom et al. ............. 370/343 |
| 2007/0263579 | A1 | * | 11/2007 | Ozluturk ....................... 370/338 |
| 2008/0267126 | A1 | * | 10/2008 | Vujcic et al. .................. 370/330 |
| 2008/0279257 | A1 | * | 11/2008 | Vujcic et al. .................. 375/132 |
| 2010/0041430 | A1 | * | 2/2010 | Ishii et al. ..................... 455/522 |
| 2011/0116465 | A1 | * | 5/2011 | Miki et al. ..................... 370/329 |

OTHER PUBLICATIONS

Japanese Office Action with translation for Application No. 2007-211594, mailed on Mar. 27, 2012 (4 pages).
Texas Instruments, "Random Access Preamble L1 Parameters in E-UTRA," 3GPP TSG RAN WG1 #49, R1-072192, Kobe, Japan, May 7-11, 2007.
Texas Instruments, "Random Access Preamble L1 Parameters in E-UTRA," 3GPP TSG RAN WG1 #49bis, R1-072838, Orlando, USA, Jun. 25-29, 2007.

(Continued)

*Primary Examiner* — Kenny Lin
(74) *Attorney, Agent, or Firm* — Osha Liang LLP (57) ABSTRACT

In a cell having a system bandwidth wide enough to allow a RACH from a UE and a PUSCH from another UE to be frequency-division multiplexed in the same subframe, a PUCCH unattached to the PDSCH and the RACH are frequency-division multiplexed in the same subframe. In a cell having a narrow system bandwidth, a PUCCH unattached to the PUSCH and the RACH are time-division multiplexed, and the RACH is transmitted for a period for a BCH or others not required to feed ACK/NACK back to a base station apparatus. Alternatively, the PUCCH unattached to the PUSCH and the RACH are frequency-division multiplexed, and the bandwidth for the RACH may be set to be narrower than the bandwidth scheduled for the RACH in a cell having a wider system bandwidth.

18 Claims, 10 Drawing Sheets

OTHER PUBLICATIONS

Texas Instruments, "Interference between Data and RACH in EUTRA," 3GPP TSG RAN WG1 #48, R1-070716, St. Louis, USA, Feb. 12-16, 2007.

Texas Instruments, "Outstanding issues in Random Access Preamble Design for E-UTRA," 3GPP TSG RAN WG1 #48bis, R1-071471, St. Julians, Malta, Mar. 26-30, 2007.

Texas Instruments, "Random Access Preamble Sequence Length for E-UTRA," 3GPP TSG RAN WG1 #49, R1-072191, Kobe, Japan May 7-11, 2007.

International Search Report w/translation from PCT/JP2008/064487 dated Nov. 4, 2008 (2 pages).

Written Opinion from PCT/JP2008/064487 dated Nov. 4, 2008 (3 pages).

TSG-RAN WG1 #43; R1051445; "E-UTRA Random Access"; Ericsson; Seoul, Korea; Nov. 7-11, 2005; pp. 1-4 (4 pages).

3GPP TSG-RAN WG1 LTE, R1060480; "Principles of RACH"; Qualcomm Europe; Denver, Colorado USA; Feb. 13-17, 2006; pp. 1-7 (7 pages).

3GPP TSG RAN WG1 #44-bis, R1060866; "RACH preamble design from E-UTRA"; Texas Instruments; Athens, Greece; Mar. 27-31, 2006; pp. 1-9 (9 pages).

3GPP TR 25.814 V7.0.0; "Physical layer aspects for evolved Universal Terrestrial Radio Access (UTRA)"; Jun. 2006 (126 pages).

3GPP TS 25.214 V7.3.0; "Physical layer procedures (FDD)"; Dec. 2006 (60 pages).

3GPP TSG RAN WG Meeting #47bis; R1-070103; "Downlink L1/L2 Control Signaling Channel Structure: Coding"; NTT DoCoMo et al.; Sorrento, Italy; Jan. 15-19, 2007 (17 pages).

\* cited by examiner

MOBILE COMMUNICATION SYSTEM, BASE STATION APPARATUS, USER APPARATUS AND METHOD

TECHNICAL FIELD

The present invention relates to mobile communication systems, base station apparatuses, user apparatuses and methods.

BACKGROUND ART

A successor communication scheme to W-CDMA (Wideband-Code Division Multiple Access), HSDPA (High Speed Downlink Packet Access), HSUPA (High Speed Uplink Packet Access) and other schemes, that is, a LTE (Long Term Evolution) scheme, are being discussed in W-CDMA standardization group 3GPP. As radio access schemes for the LTE, OFDM (Orthogonal Frequency Division Multiplexing) and SC-FDMA (Single Carrier-Frequency Division Multiple Access) schemes are promising for downlinks and uplinks, respectively. For example, see 3GPP TR 25.814 (V7.0.0), "Physical Layer Aspects for Evolved UTRA", June 2006.

The OFDM scheme is a multi-carrier transmission scheme where a frequency band is segmented into multiple smaller frequency bands (subcarriers) and data is transmitted in the individual subcarriers. The subcarriers are orthogonally and densely arranged on a frequency axis, which can achieve faster transmission and improve frequency utilization efficiency.

The SC-FDMA scheme is a single-carrier transmission scheme where a frequency band is segmented for different terminals and the divided frequency bands are used by the different terminals for transmissions. According to the SC-FDMA scheme, not only can interference between the terminals be easily and effectively reduced but also variations of transmit power can be suppressed. As a result, the SC-FDMA scheme is preferred from some standpoints such as reduced power consumption for terminals and wider coverage.

In the LTE system, for both uplinks and downlinks, one or more resource blocks are assigned for a user apparatus or a user equipment terminal (which is typically a mobile station but may be a fixed station) for communications. The resource blocks are shared among a large number of mobile stations in the system. In the LTE system, a base station apparatus determines for which of the multiple mobile stations the resource blocks are assigned for each subframe having 1 ms. This process is referred to as scheduling. The subframe may be referred to as a transmission time interval (TTI). In the downlinks, the base station apparatus transmits a shared channel in one or more resource blocks to a mobile station selected in the scheduling. In the uplinks, the selected mobile station transmits a shared channel in one or more resource blocks to the base station apparatus.

Meanwhile, user apparatuses transmit random access channels (RACHs) to base station apparatuses at initial accessing such as power activation time, at requesting of resource assignment, and at resynchronization such as at handover failure time. The base station apparatuses receive the RACHs and transmit information necessary for subsequent communications to the user apparatuses. It is expected that the RACHs may be used in the LTE system and other mobile communication systems. In the LTE system and other mobile communication systems, variable system bandwidths may be used, for example, 1.4 MHz, 5 MHz, 10 MHz and 20 MHz. For example, 3GPP TS 25.214 discloses a conventional technique for periodically providing timings when the RACHS may be transmitted at initial activation time. The system bandwidth disclosed in this reference is not variable, unlike the LTE system, and the RACHs are transmitted in the overall frequency band. Also, it is desirable that the RACHs be orthogonally multiplexed with other signals from the standpoint such as improved signal quality. For this point, the LTE system may differ from conventional systems where a CDM (Code Division Multiplexing) scheme is presumed. At the present time, it may not be fully studied when the RACHs are to be transmitted in the systems using variable system bandwidths such as the LTE system. See 3GPP R1-070103, "Downlink L1/L2 Control Signaling Channel Structure: Coding" for reference.

DISCLOSURE OF INVENTION

Problem to be Solved by the Invention

One object of the present invention is to provide a mobile communication system including multiple cells having different system bandwidths for easily informing a user how RACHs are orthogonally multiplexed with other uplink signals.

Means for Solving the Problem

In embodiments of the present invention, a mobile communication system including multiple cells having different system bandwidths is used.

In a cell having a wide system bandwidth enough to allow a random access channel from a user apparatus and an uplink shared data channel from another user apparatus to be frequency-division multiplexed in a same subframe, an uplink control channel unattached to the uplink shared data channel and the random access channel are frequency-division multiplexed in the same subframe.

In a cell that does not have a wide system bandwidth enough to allow a random access channel from a user apparatus and an uplink shared data channel from another user apparatus to be frequency-division multiplexed in a same subframe, an uplink control channel unattached to the uplink shared data channel and the random access channel are time-division multiplexed, and the random access channel may be transmitted for a transmission period of a downlink signal not required to feed acknowledgement information indicative of positive acknowledgement or negative acknowledgement back to a base station apparatus. Alternatively, the uplink control channel unattached to the uplink shared data channel and the random access channel are frequency-division multiplexed, and a bandwidth scheduled for the random access channel in the cell that does not have a wide system bandwidth is set to be narrower than a bandwidth scheduled for the random access channel in the cell that has a wide system bandwidth.

Advantage of the Invention

According to the aspects of the present invention, it is possible to inform a user how RACHs are orthogonally multiplexed with other uplink signals in a mobile communication system including multiple cells having different system bandwidths.

LIST OF REFERENCE SYMBOLS $50_1$, $50_2$: cell
$100_1$, $100_2$, $100_3$, $100_4$: mobile station
$200_1$, $200_2$: base station apparatus
300: access gateway apparatus
400: core network
102: RACH sequence generation unit
104: transmission subframe control unit
106: frequency shift unit
108: radio unit
111: RACH slot control unit
112: BCH information generation unit
113: radio unit
114: FFT unit
115: RACH resource identification unit
116: RACH detection unit

BEST MODE FOR CARRYING OUT THE INVENTION

According to one embodiment of the present invention, in a cell having a sufficiently wide system bandwidth, an uplink control channel PUCCH unattached to an uplink shared data channel PUSCH and a random access channel RACH are frequency-division multiplexed in the same subframe. In a cell that does not have such a wide system bandwidth (particularly a cell having the minimum bandwidth), the uplink control channel PUCCH unattached to the uplink shared data channel PUSCH and the random access channel RACH are time-division multiplexed (TDM). The random access channel RACH may be transmitted for a transmission period of a downlink signal (such as BCH or PCH) being not required to feed acknowledgement information ACK/NACK indicative of positive acknowledgement or negative acknowledgement back to a base station apparatus eNB. Alternatively, the uplink control channel PUCCH unattached to the uplink shared data channel PUSCH and the random access channel RACH are frequency-division multiplexed (FDM), and a bandwidth (for example, a bandwidth corresponding to four resource blocks) scheduled for the random access channel in a cell having a narrow system bandwidth may be set to be narrower than a bandwidth (for example, a bandwidth corresponding to six resource blocks) scheduled for the random access channel in a cell having a wide system bandwidth. By predefining RACH multiplexing methods depending on whether the system bandwidth is wide or narrow, it is possible to not only transmit information about resources available for the RACH to user apparatuses easily but also improve transmission quality of the RACH.

If the system bandwidth is narrow, the RACH and the PUCCH are time-division multiplexed, which can maintain such a wide frequency bandwidth for the RACH. This is preferable from the viewpoint of quality improvement due to frequency diversity effect.

If the system bandwidth is narrow, it is preferable that the RACH and the PUCCH be frequency-division multiplexed in order to enable the RACH to be transmitted at any time.

If the system bandwidth is wide, the maximum bandwidth scheduled for the uplink control channel PUCCH unattached to the uplink shared data channel may be predefined corresponding to the size of the system bandwidth. The random access channel RACH is mapped to only a band other than a band to which the uplink control channel is allowed to be mapped. This is preferable from the viewpoint of unique determination of frequencies to which the RACH may be mapped and reduced signaling to user apparatuses.

In a predefined hopping period including multiple subframes, a frequency in a subframe to which the random access channel may be mapped may be different from a frequency in another subframe to which the random access channel may be mapped. Modification of frequency resources is preferable from the viewpoint of improved frequency diversity effect.

From the viewpoint of simplified signal processing, if different scramble codes are applied to respective downlink signals transmitted at a predefined frequency for a predefined time period in a cyclic manner, the hopping period is preferably set to be equal to the predefined time period.

More frequency resources to which the random access channel may be mapped may be provided for a wider system bandwidth.

In order to identify hopping patterns easily and use as many different frequencies in multiple cells simultaneously as possible, a pattern in a cell of frequencies and time periods to which the random access channel may be mapped in the hopping period may be temporally shifted from patterns in other cells by a cyclic shift amount.

In order to identify hopping patterns easily, it is preferable that predefined correspondence among patterns of frequencies and time periods to which the random access channel may be mapped in the hopping period, systems bandwidths and cyclic shift amounts be known beforehand.

In order to transmit information about resources available for the RACH to user apparatuses easily, the number of subframes to which the random access channel may be mapped in the hopping period and the cyclic shift amount may be transmitted to user apparatuses as broadcast information.

[System]

Figure 1:
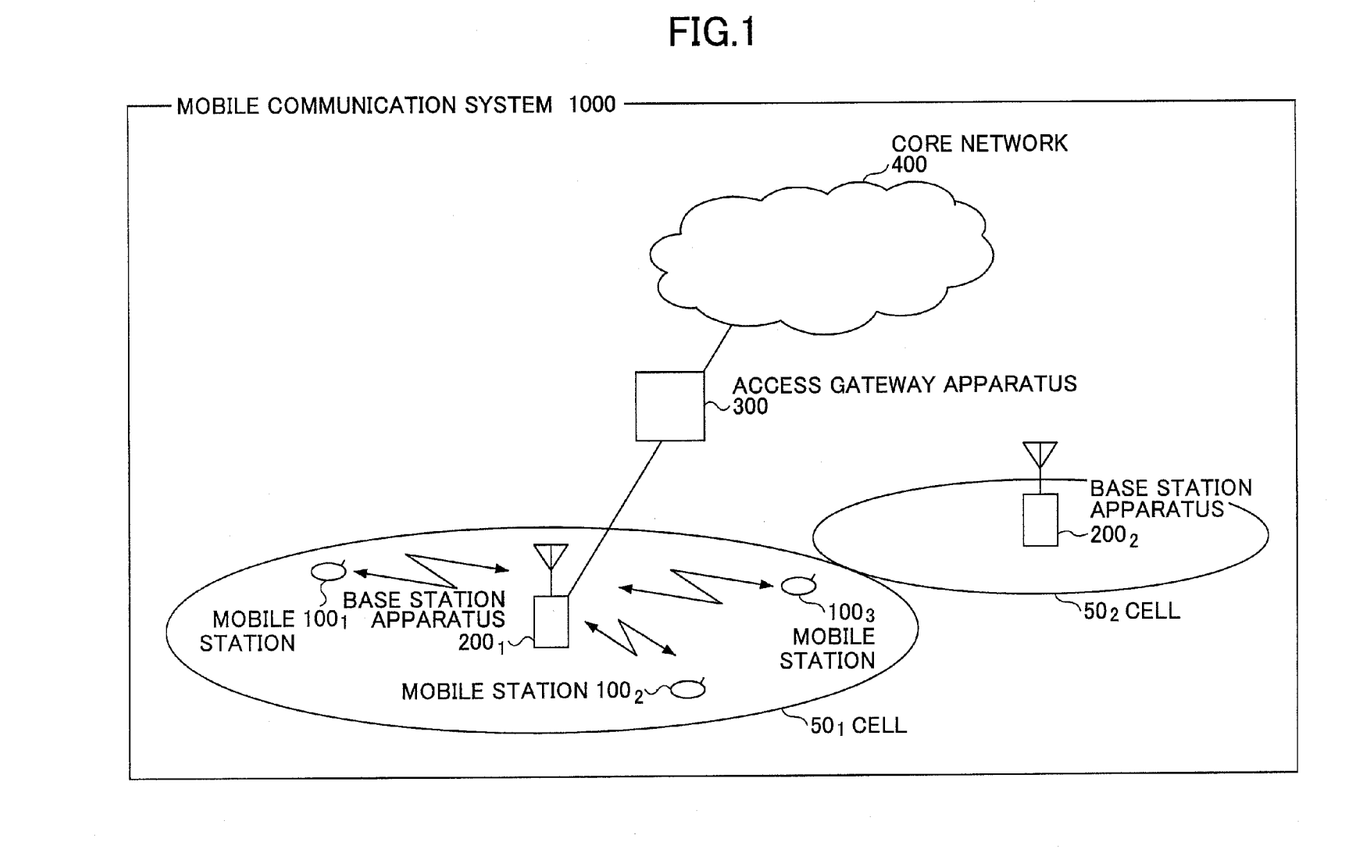
FIG. 1 illustrates a mobile communication system.

FIG. 1 illustrates a mobile communication system according to one embodiment of the present invention. A mobile communication system 1000 may be a LTE (also referred to as Evolved UTRA and UTRAN or Super 3G) applied system, for example. The mobile communication system 1000 includes multiple base station apparatuses 200 (eNode Bs or eNBs) and multiple mobile stations $100_n$ ($100_1$, $100_2$, $100_3$, ..., $100_n$ where n is a positive integer) communicating with the base station apparatuses 200. The base station apparatuses $200_1$, $200_2$, ... are connected to an upper station such as an access gateway apparatus 300, which is in turn connected to a core network 400. The mobile stations 100$_n$ communicate with the base station apparatus 200$_1$ in a cell 50$_1$ and the base station apparatus 200$_2$ in a cell 50$_2$.

Each of the mobile stations (100$_1$, 100$_2$, 100$_3$, . . . , 100$_n$) has the same arrangement, features and states, and thus the mobile station 100$_n$ is focused on below unless specifically stated otherwise. For convenience, mobile stations communicate with base station apparatuses over the air, but more generally, user apparatuses or user equipment (UE) including the mobile stations and fixed terminals may communicate with the base station apparatuses.

In the mobile communication systems 1000, OFDM and SC-FDMA are applied for downlink and uplink radio access schemes, respectively. As stated above, OFDM is a multi-carrier transmission scheme where a frequency band is segmented into several smaller frequency bands (subcarriers) and data is mapped into the individual subcarriers for communications. SC-FDMA is a single-carrier transmission scheme where a system frequency band is segmented for different terminals and the terminals use the different frequency bands, resulting in reduction in interference between the terminals.

Communication channels for LTE and others are outlined herein.

For downlinks, a PDSCH (Physical Downlink Shared Channel) shared among the mobile stations 100$_n$ and a PDCCH (Physical Downlink Control Channel) or a downlink L1/L2 control channel are used. User data or normal data signals are transmitted in the PDSCH. Also, downlink scheduling information (such as user IDs for users communicating over the PDSCH and transport format information for the user data), uplink scheduling grants (such as user IDs for users communicating over physical uplink shared channels and transport format information for the user data), acknowledgement information for the physical uplink shared channels and others are transmitted in the PDCCH.

In the downlinks, a CCPCH (Common Control Physical Channel) is transmitted. The CCPCH includes a BCH (Broadcast Channel). The BCH transmitted in the CCPCH is referred to as a static BCH. In addition to the static BCH, a dynamic BCH or a dynamic part is provided. The dynamic BCH is mapped into the PDSCH. In this case, downlink scheduling information for the dynamic BCH is transmitted in the PDCCH. Also, broadcast information is mapped into the dynamic BCH. In this case, the CCPCH and/or the PDSCH correspond to physical channels, the BCH corresponds to a transport channel, and the broadcast information corresponds to a logical channel.

For uplinks, a PUSCH (Physical Uplink Shared Channel) shared among the mobile stations 100$_n$ and a PUCCH (Physical Uplink Control Channel) are used. User data or normal data signals are transmitted in the PUSCH.

There are cases where the PUCCH is attached to the PUSCH and where the PUCCH is not attached to the PUSCH. In the latter case, a downlink CQI (Channel Quality Indicator), acknowledgement information for the PDSCH and others are transmitted as the PUCCH in a dedicated band. Such a dedicated band is typically reserved at both ends of the system band. The CQI is used in scheduling, adaptive modulation and demodulation, AMCS (Adaptive Modulation and Coding Scheme) and other operations for the PDSCH. The acknowledgement information indicates either positive acknowledgement (ACK) indicative of successful reception of a transmitted signal or negative acknowledgement (NACK) indicative of unsuccessful reception of the transmitted signal.

The system bandwidth of the mobile communication system 1000 is set to 20 MHz at a maximum, for example, and different system bandwidths may be used for different cells. For example, a certain cell may have a system bandwidth such as 1.4 MHz, 5 MHz, 10 MHz or 20 MHz.

Figure 2:
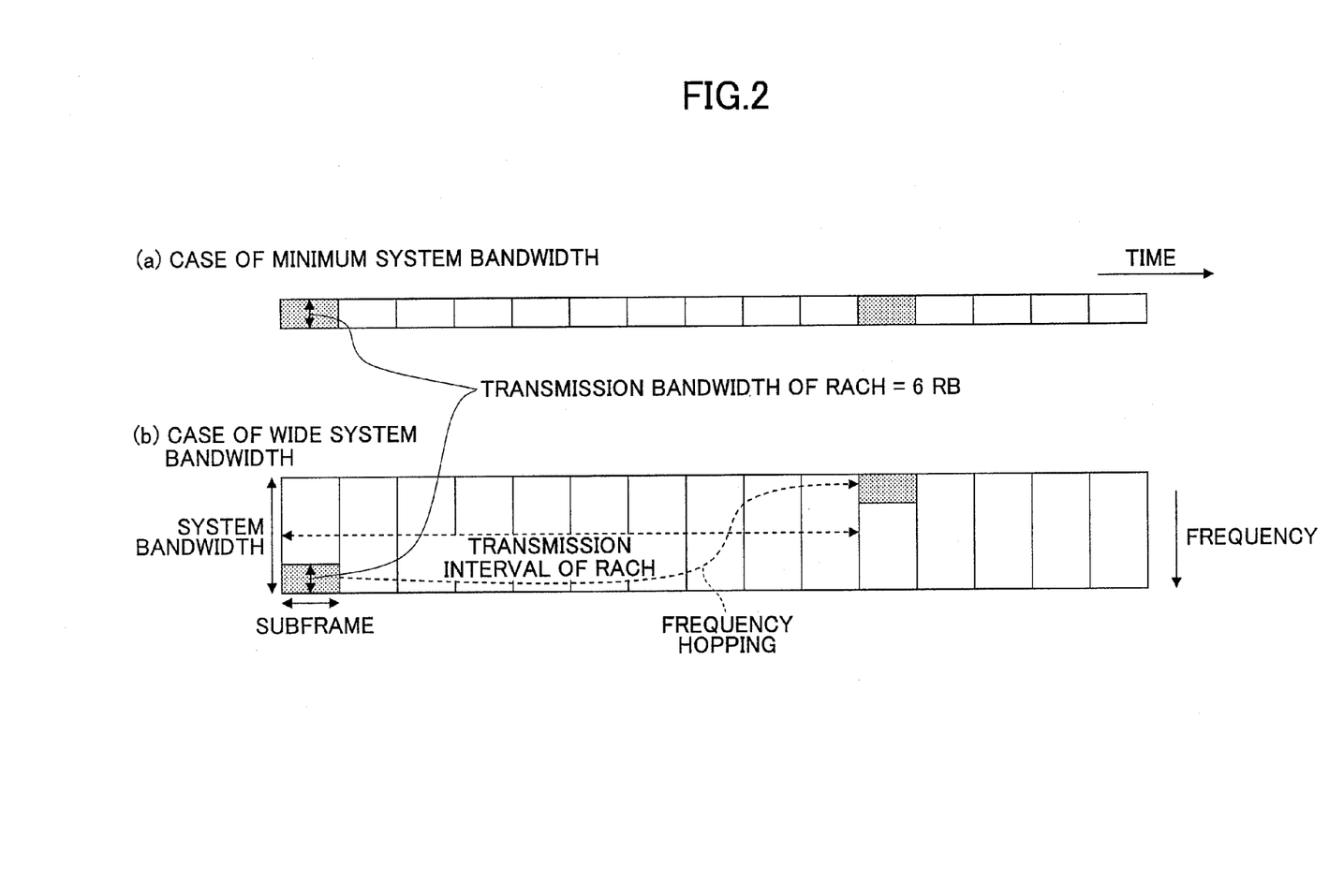
FIG. 2 schematically illustrates RACH mapping methods corresponding to narrow and wide system bandwidths.

FIG. 2 schematically illustrates that different mapping methods for RACHs (Random Access Channels) are applied depending on wide and narrow system bandwidths according to one embodiment of the present invention as described in detail with reference FIG. 3 and subsequent drawings. The RACH occupies a bandwidth of about six resource blocks (RBs). There are cases where the RACH occupies four or five RBs, as stated below. Assuming that one resource block has 180 kHz, the six resource blocks occupy 1.08 MHz. In the above example, the system bandwidth has the minimum 1.4 MHz, which includes a guard interval provided for out-of-band distortion power together with the six resource blocks. In other words, at most six resource blocks are included in one subframe in a cell having the minimum system bandwidth. Thus, as illustrated in FIG. 2(*a*), if the RACH is transmitted in any subframe in the case of the minimum system bandwidth, the RACH occupies the whole system bandwidth. As illustrated in FIG. 2(*b*), for the wide system bandwidth, the RACH is frequency multiplexed with other signals. As described below, the RACH may be mapped into frequencies in accordance with a certain hopping pattern.

[Multiplexing Method for Narrow System Bandwidth]

Figure 3:
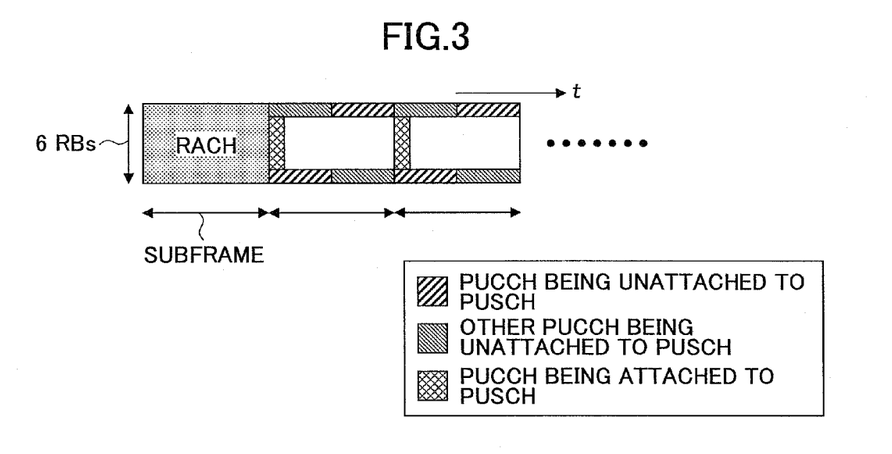
FIG. 3 illustrates a first RACH multiplexing method in case of the minimum system bandwidth.

FIG. 3 illustrates an exemplary multiplexing method for the RACH and other signals in the case where the system bandwidth includes six resource blocks as illustrated in FIG. 2(*a*). In FIG. 3, it is illustrated that abase station apparatus receives signals in uplinks. In the illustrated example, the RACH occupies the whole band of a certain subframe (the whole system frame band). The RACH and signals other than the RACH are not multiplexed with each other within the same subframe. In the illustration, PUCCHs are included in subframes other than the RACH. The PUCCH (such as an L1/L2 uplink control channel) attached to the PUSCH is time-division multiplexed (TDM) with the PUSCH (corresponding to the margins in the subframes, although not illustrated specifically). The PUCCH unattached to the PUSCH (such as ACK/NACK and CQI) is transmitted in dedicated bandwidths provided at both ends of the system band.

Meanwhile, acknowledgement signals (ACK/NACK) are to be fed back in uplinks for some of various signals transmitted in downlinks, and such acknowledgement signals are not to be fed back for the other signals. The former type of signals include the PDSCH, and the latter type of signals include the BCH and a PCH (Paging Channel), for example. If uplink transmission timing of the RACH matches timing of a downlink signal for which the acknowledgement signal is expected to be fed back, a user apparatus could not transmit the acknowledgement signal for the downlink signal subsequently. Thus, in the case where the RACH is multiplexed with other signals in accordance with the TDM scheme as illustrated in FIG. 3, the uplink transmission timing of the RACH must be matched to the timing of the downlink signal (such as BCH and PCH) for which the acknowledgement signal is not expected to be fed back.

Figure 4:
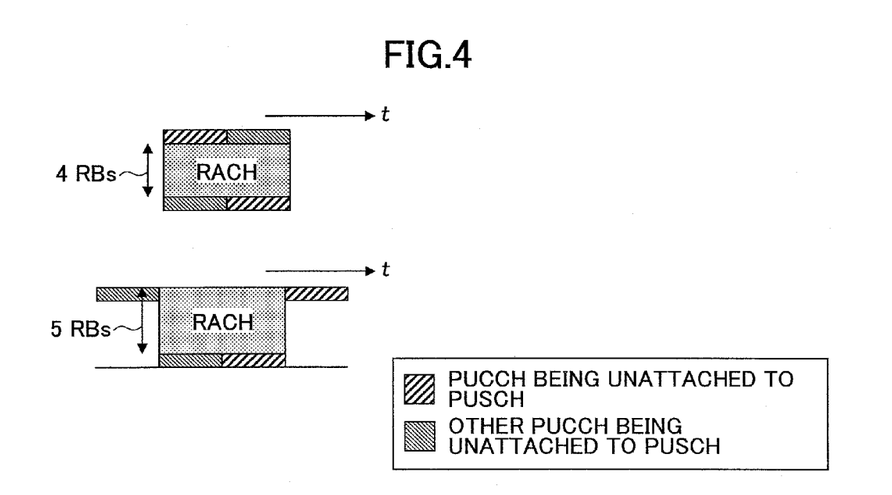
FIG. 4 illustrates a second RACH multiplexing method in case of the minimum system bandwidth.

FIG. 4 illustrates another exemplary multiplexing method for the RACH and other signals in the case where the system bandwidth includes six resource blocks as illustrated in FIG. 2(*a*). In the illustrated example, the bandwidth scheduled by the RACH reduces the six resource blocks to four or five resource blocks. Then, the PUCCH unattached to the PUSCH and the RACH are frequency-division multiplexed with each other in the same subframe. Depending on the system bandwidth being or not being minimum, six resource blocks and less than six resource blocks may be selectively used for the bandwidth scheduled by the RACH. Alternatively, the RACH may occupy less than six resource blocks, for example, four resource blocks, over all cells, and the PUCCH and the RACH may be frequency-division multiplexed with each other in the same subframe for any system bandwidth.

It is preferable to set the bandwidth of the RACH more widely to be equal to six resource blocks as illustrated in FIG. 3 from the viewpoint of frequency diversity effect independent of the system bandwidth and assurance of RACH quality. Also, it is preferable to set the bandwidth of the RACH to be equal to less than six resource blocks for the system bandwidth of six resource blocks as illustrated in FIG. 4 in order to enable the RACH to be transmitted at any time. In the case as illustrated in FIG. 3, transmission timing of the RACH must be matched with timing of the BCH, the PCH or others.

[Multiplexing Method for Wide System Wandwidth]

Figure 5:
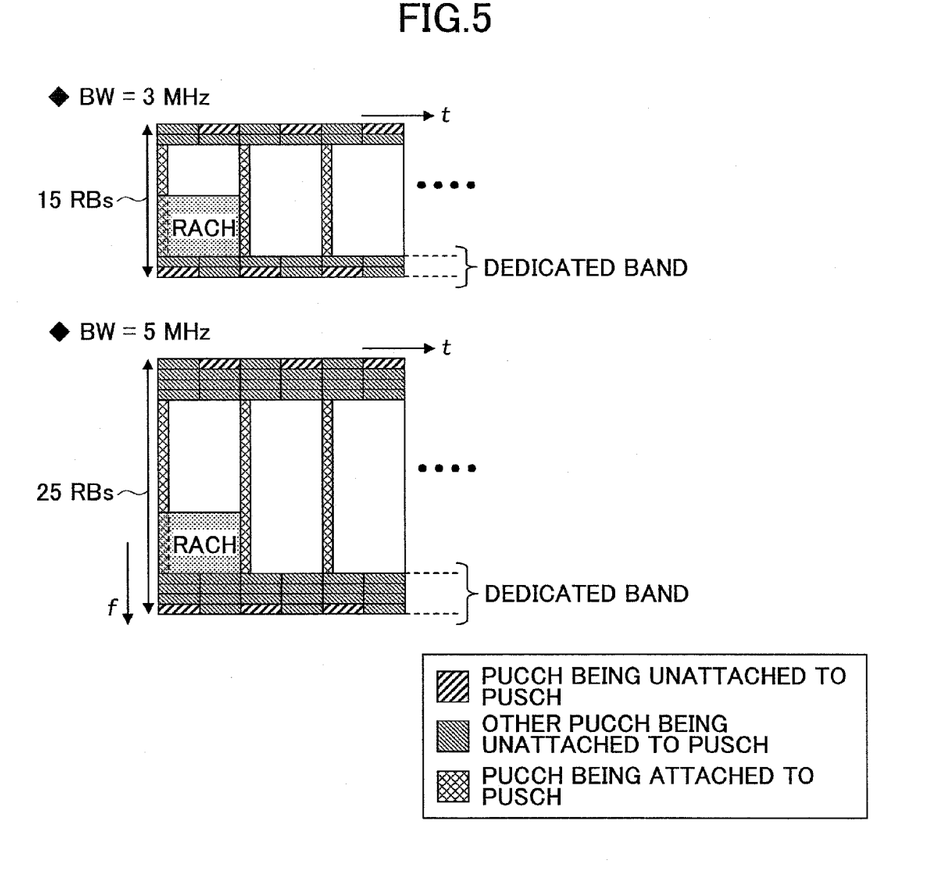
FIG. 5 illustrates a RACH multiplexing method in case of the wide system bandwidth.

FIG. 5 illustrates an exemplary RACH multiplexing method for the system bandwidth being wider than the minimum bandwidth. As illustrated, the RACH and signals other than the RACH are frequency-division multiplexed with each other in the same subframe. The bandwidth scheduled by a PUCCH unattached to a PUSCH may be variably adjusted depending on the number of users. Alternatively, different bandwidths may be applied for the PUCCH unattached to the PUSCH depending on the system bandwidth. It is not preferable to change mapping position of the RACH depending on the number of users or other factors from the viewpoint of reduction in control signaling. From this viewpoint, it is preferable to limit the mapping position of the RACH such that the RACH can be mapped into frequencies to which the PUCCH is not mapped at all. For example, the maximum bandwidth for mapping the PUCCH may be predefined for each system bandwidth, and the RACH may be mapped to the frequencies to which the PUCCH is not mapped at all.

[Hopping (First Type)]

In the case of the system bandwidth being greater than the minimum bandwidth, the same frequency for mapping the RACH may be maintained independent of subframes. However, it is preferable that frequencies to which the RACH may be mapped be variously hopped from the viewpoint of the frequency diversity effect.

Figure 6:
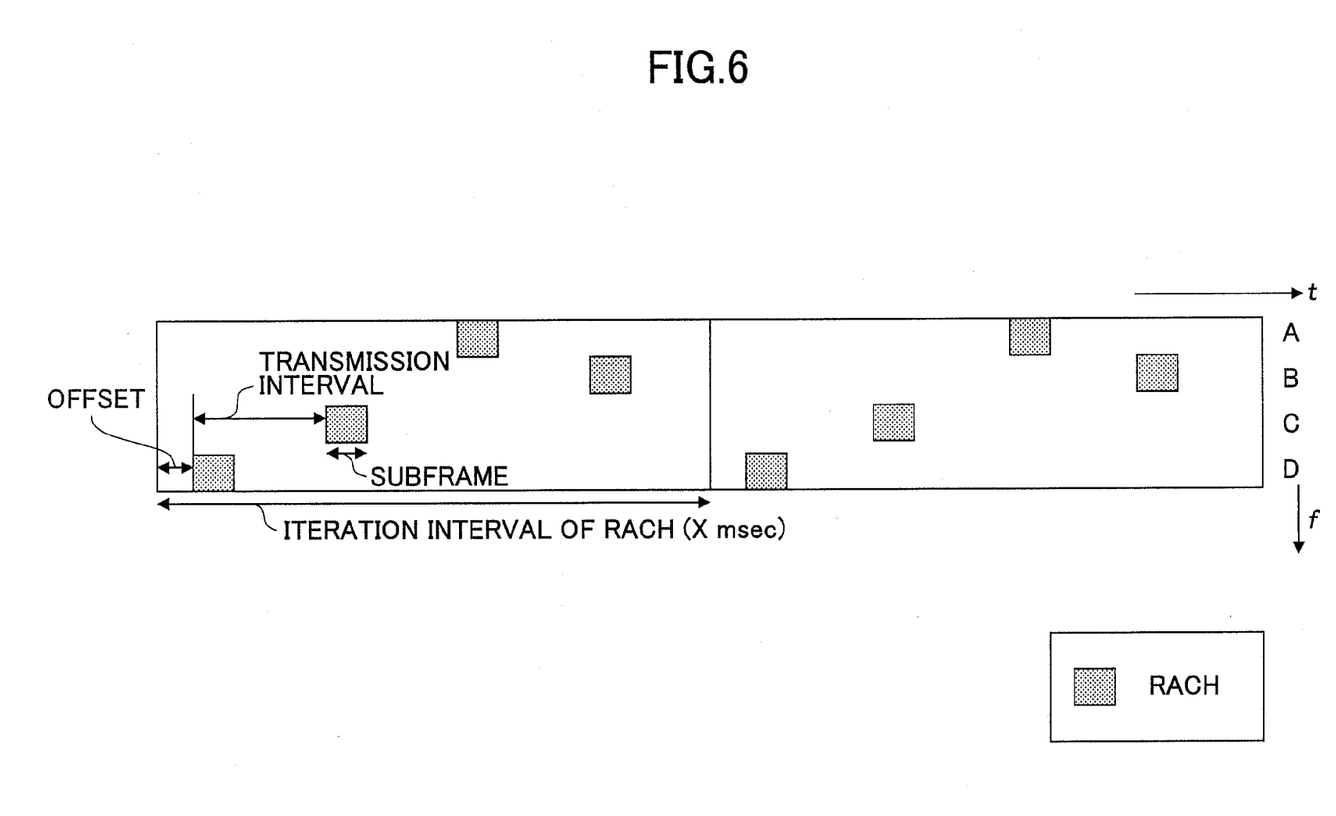
FIG. 6 illustrates exemplary hopping of frequencies into which RACHs are mapped.

In the example illustrated in FIG. 6, four frequencies A, B, C and D to which the RACH may be mapped are provided, and the RACH may be mapped to the frequencies D, C, A and B chronologically. It is assumed that the RACH occupies six resource blocks within a single subframe. In the illustrated example, such a frequency hopping pattern is repeated every RACH iteration period. As one example, the RACH iteration period may be set to 40 ms including four radio frames including ten subframes of 1 ms. In order to derive transmission timing of the RACH from reception timing of the BCH, the RACH iteration period may be preferably set to a transmission period of the BCH, for example, 40 ms. In addition, the BCH or a DL-RS is transmitted at a predefined frequency, and different scramble codes are cyclically applied to the BCH and others. For this reason, the cycle of these different scramble codes may be matched with the RACH iteration period. In this manner, it is preferable that the RACH iteration period be matched with the BCH transmission period or the cycle of the scramble codes from the viewpoint of simple and accurate derivation of the RACH transmission timing.

[Hopping (Second Type)]

Figure 7:
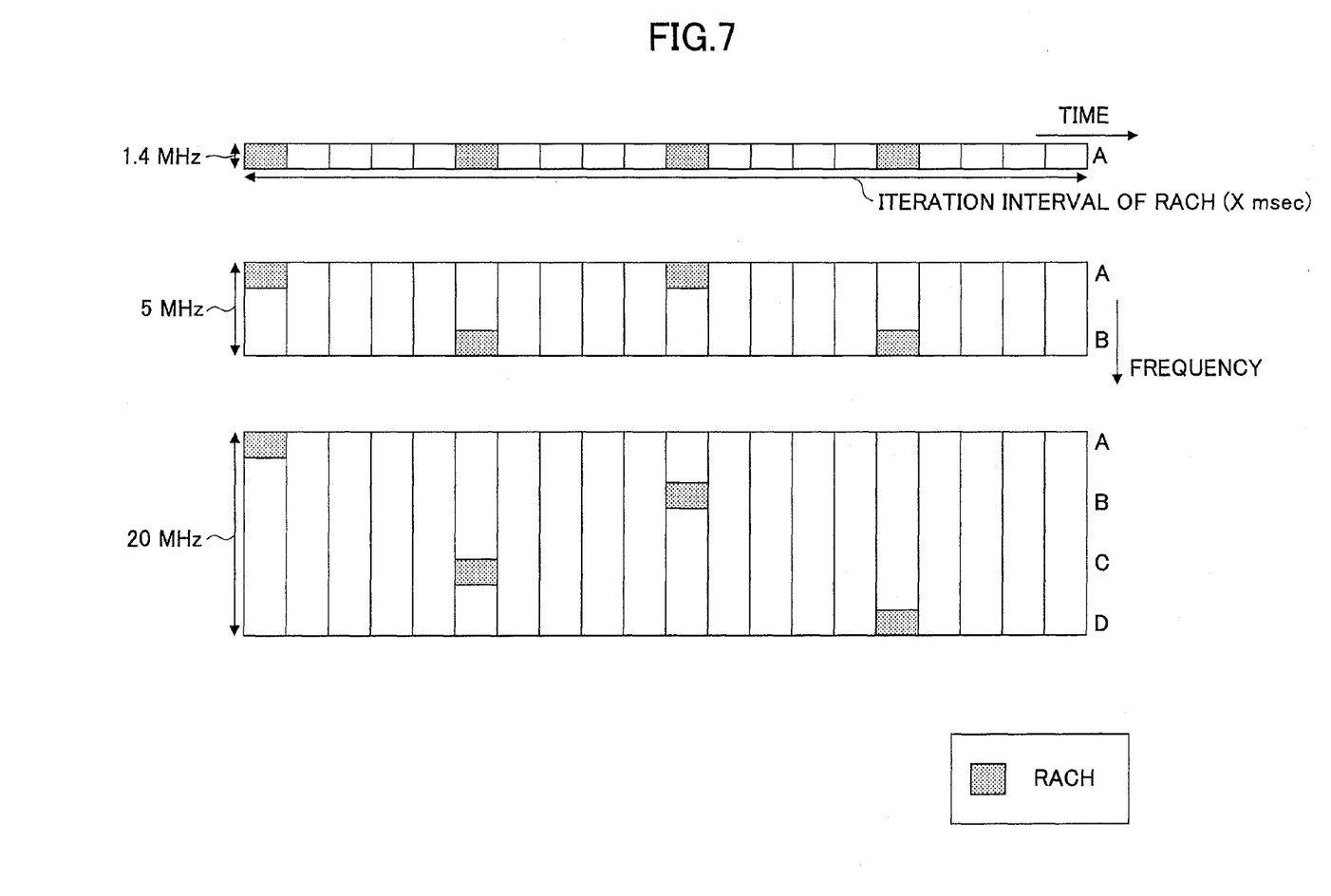
FIG. 7 illustrates that a larger number of options for frequencies into which RACHs may be mapped are provided in wider system bandwidths.

FIG. 7 illustrates that more frequencies for mapping the RACH are provided for wider system bandwidths. Although not essential, in the illustrated example, the same RACH transmission frequency is applied independent of the different system bandwidths. The RACH may be transmitted once five subframes. The RACH frequency has two options A, B in case of 5 MHz and four options A to D in case of 40 MHz. In this manner, it is preferable to make the RACH transmission frequency constant independent of the system bandwidths in order to make control information regarding the RACH multiplexing method as uniform over different cells as possible.

[Hopping (Third Type)]

From the viewpoint of reduced interference to a user residing near a cell boundary, it is not preferable that the RACH can be transmitted at the same frequency in several cells (or in accordance with the same hopping pattern).

Figure 8:
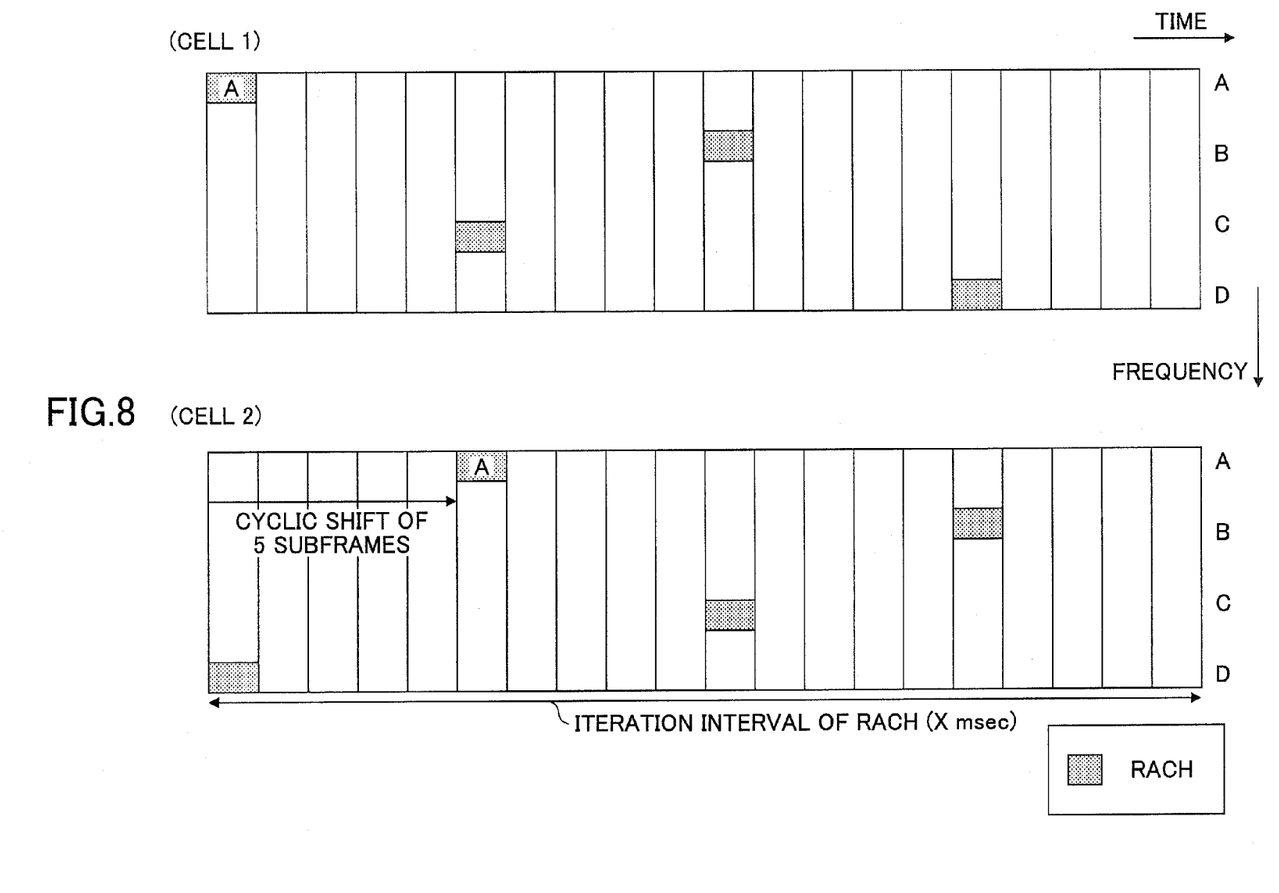
FIG. 8 illustrates hopping patterns for use in adjacent cells.

FIG. 8 illustrates that mutually cyclically shifted hopping patterns are used in adjacent cells. In any of the adjacent cell 1 and cell 2, RACHs may be mapped to frequencies . . . , A, C, B, D, A, C, . . . chronologically. Note that the pattern in cell 1 starts with A and the pattern in cell 2 starts with D. Although cell 1 and cell 2 may be synchronized with each other, it is preferable to have the patterns mutually unsynchronized by design in order to prevent frequency conflict.

[Hopping (Fourth Type)]

Figure 9:
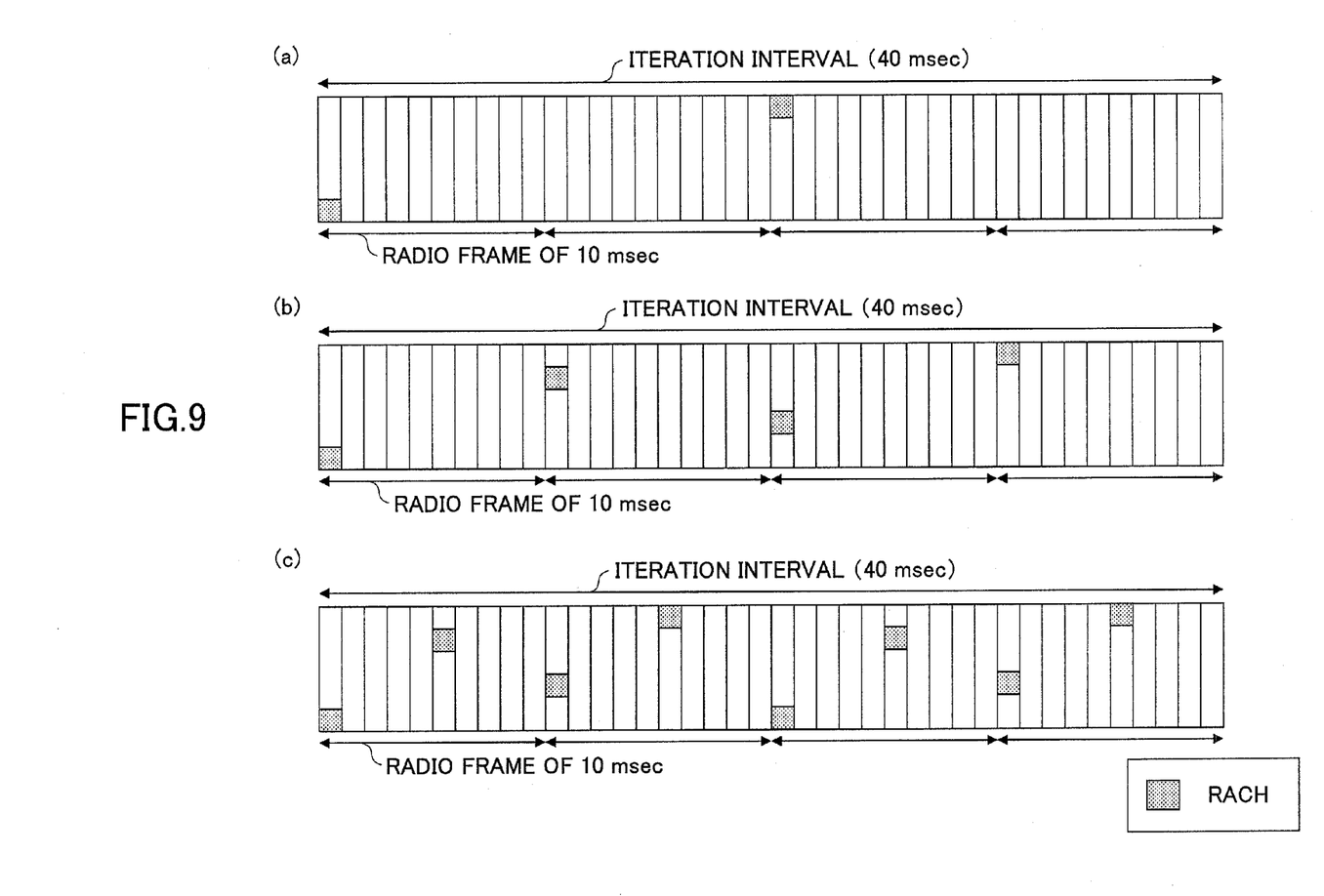
FIG. 9 illustrates that a larger number of options of frequencies into which RACHs may be mapped and a higher transmission frequency are provided in wider system bandwidths.

FIG. 9 illustrates that different transmission frequencies of RACHs are applied in addition to frequency selection as illustrated in FIG. 7. The term "transmission frequency" used herein means not frequency of actual transmissions but arrival frequency of resources to which the RACHs may be mapped. Thus, the RACHs may or may not be actually transmitted at that frequency. In the example illustrated in FIG. 9(a), the transmission frequency is equal to twice per iteration period. In the example illustrated in FIG. 9(b), the transmission frequency is equal to four times per iteration period. In the example illustrated in FIG. 9(c), the transmission frequency is equal to eight times per iteration period. If resources for mapping the RACHs are provided in this manner, hopping patterns of the RACHs can be derived based on the system bandwidth and the transmission frequency. In other words, users can easily identify resources for transmitting the RACHs through transmissions of the system bandwidth and the transmission frequency in the BCH to the users. The RACH hopping patterns may be uniquely identified using not only the system bandwidth and the transmission frequency but also other control information, for example, one-bit control information.

[User Apparatus]

Figure 10:
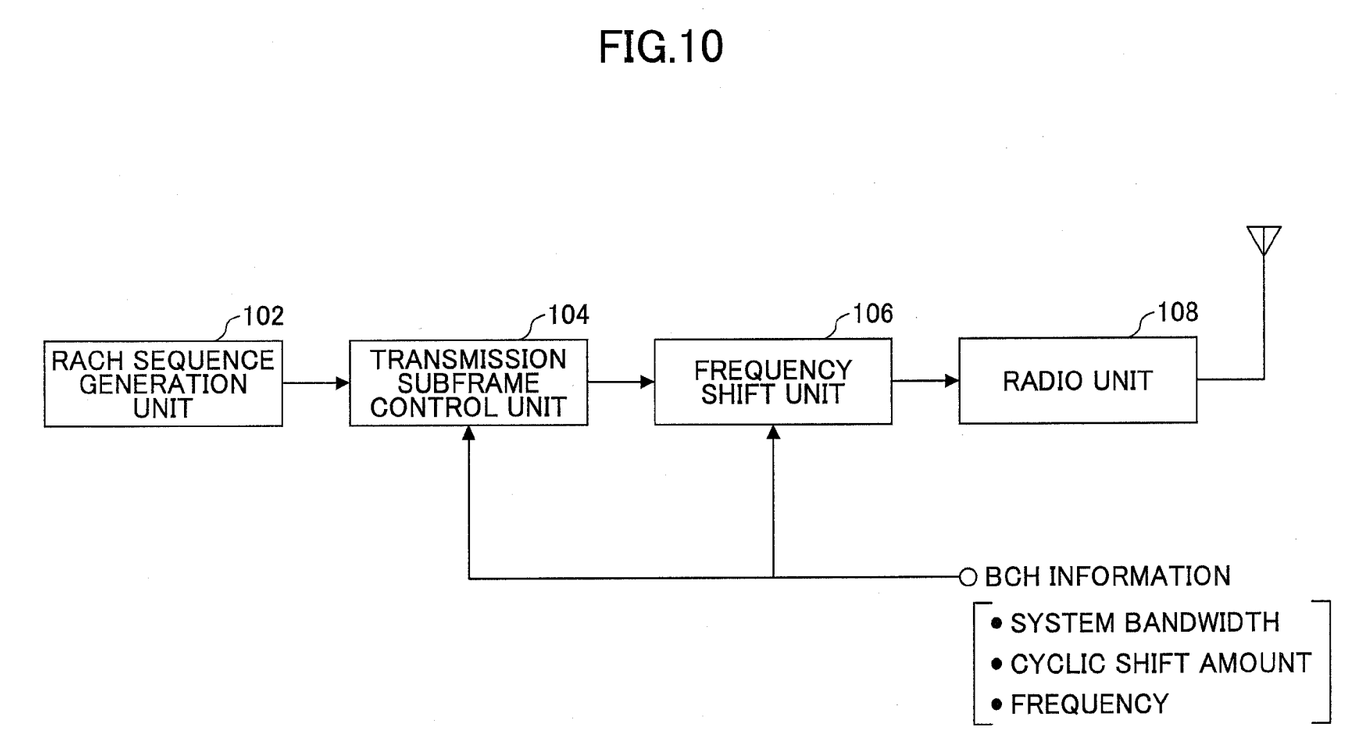
FIG. 10 is a block diagram illustrating a user apparatus according to one embodiment of the present invention.

FIG. 10 is a block diagram illustrating a user apparatus according to one embodiment of the present invention. In FIG. 10, a RACH sequence generation unit 102, a transmission subframe control unit 104, a frequency shift unit 106 and a radio unit 108 are illustrated.

The RACH sequence generation unit 102 generates information to be included in RACHs. The RACH sequence generation unit 102 generates necessary information items depending on the purpose of the RACHs such as initial access, resource assignment request and synchronization request.

The transmission subframe control unit 104 identifies timing of subframes where the RACHs can be transmitted and associates the RACHs with these subframes. The subframes for transmitting the RACHs are determined based on BCHs. The BCHs include general information commonly available to a large number of users in a resident cell. According to the present invention, the BCHs particularly include information items such as system bandwidth for the resident cell, a cyclic shift amount and frequency.

The frequency shift unit 106 maps the RACHs to the frequencies where the RACHS may be transmitted. These frequencies for transmitting the RACHs may be determined by identifying frequency hopping patterns or bands to which PUCCHs are mapped, for example. As stated above, such frequency hopping patterns may be derived based on information items such as the system bandwidth and the cyclic shift amount.

The radio unit 108 performs signaling operations to transmit the RACHs as radio signals.

[Base Station Apparatus]

Figure 11:
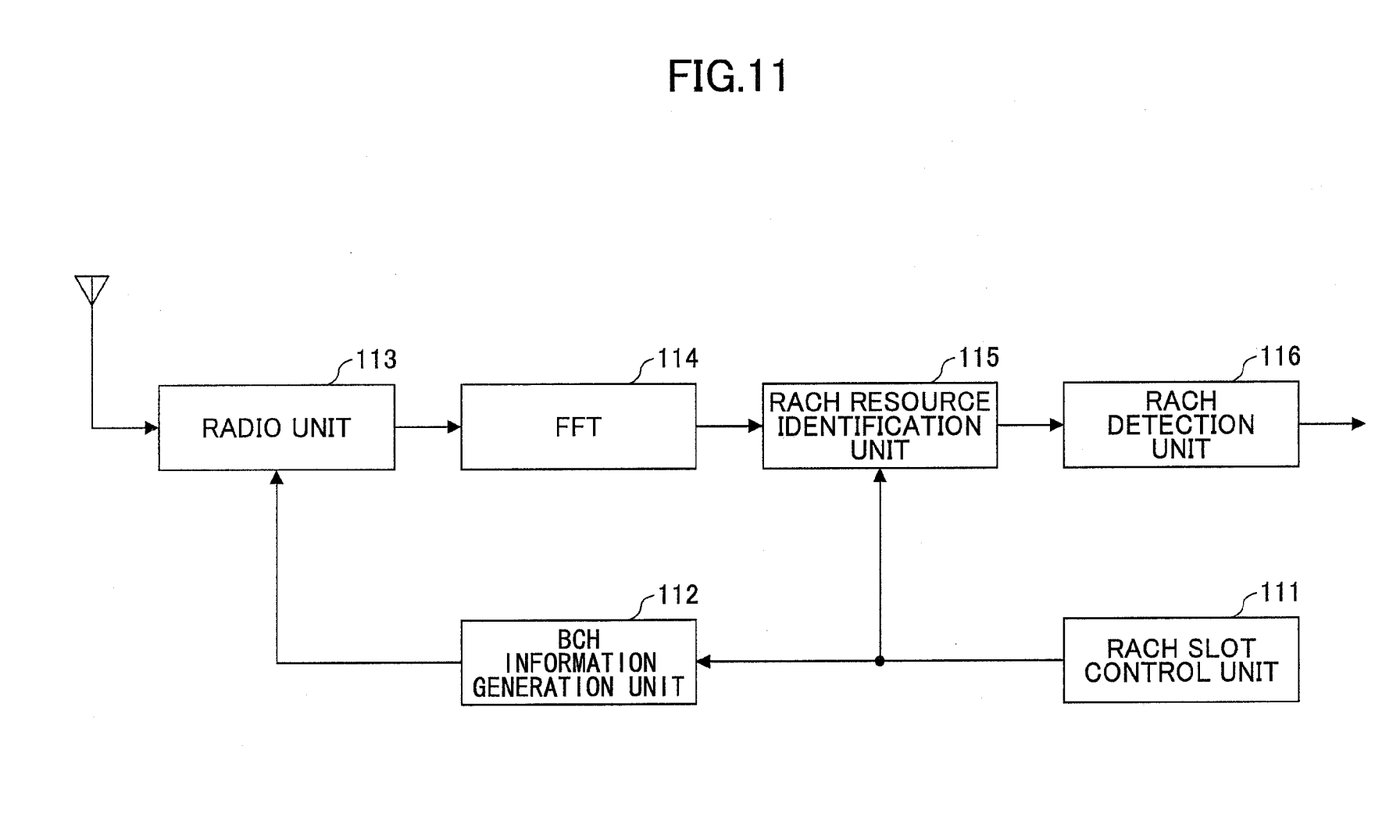
FIG. 11 is a block diagram illustrating a base station apparatus according to one embodiment of the present invention.

FIG. 11 is a block diagram illustrating a base station apparatus according to one embodiment of the present invention. In FIG. 11, a RACH slot control unit 111, a BCH information generation unit 112, a radio unit 113, a FFT unit 114, a RACH resource identification unit 115 and a RACH detection unit 116 are illustrated.

The RACH slot control unit 111 determines how user apparatuses residing within its own cell transmit RACHs. Specifically, the RACH slot control unit 111 identifies frequency and time resources where the RACHs may be transmitted. The determined contents may be fixed in the system or be variably controlled depending on situations. The RACH slot control unit 111 may determine some information items such as a hopping pattern of frequencies used for the RACHs, a cyclic shift amount of the hopping pattern and a frequency for allowing the RACHs to be transmitted. These information items may be derived in consideration of the system bandwidth, the number of accommodated users, hopping cell patterns of adjacent cells, maximum bandwidths of PUCCHs unattached to PUSCHs and others.

The BCH information generation unit 112 includes the information items in the BCHs (such a the hopping pattern of RACH frequency resources, the cyclic shift amount of the hopping pattern and the frequency for allowing the RACHs to be transmitted) indicative of resources available for the RACHs. The BCHs include other general information items such as a cell ID.

The radio unit 113 performs signal conversion between base band signals for use in the base station apparatus and radio signals for radio transmissions to user apparatuses.

The FFT unit 114 performs Fourier transform on received signals for conversion into frequency domain signals. If a known mapping has been performed, the corresponding demapping is performed.

The RACH resource identification unit 115 identifies resources where the RACHs may be transmitted. The resource position (time and frequency) is determined by the RACH slot control unit 111.

The RACH detection unit 116 detects whether the RACHs are included in the resources identified by the RACH resource identification unit 115. If the RACHs are included, necessary control information for user apparatuses is transmitted depending on the purpose of the RACHs (such as initial access, resource assignment and synchronization).

The present invention has been described with reference to the specific embodiments, but the embodiments are simply illustrative and variations, modifications, alterations and substitutions could be contrived by those skilled in the art. In the above description, some specific numerical values are used for better understanding of the present invention. Unless specifically indicated, however, these numerical values are simply illustrative and any other suitable values may be used. Separation of the embodiments or items are not essential to the present invention, and descriptions in two or more embodiments or items may be combined as needed. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This international patent application is based on Japanese Priority Application No. 2007-211594 filed on Aug. 14, 2007, the entire contents of which are hereby incorporated by reference.

The invention claimed is:

1. A mobile communication system including multiple cells having different system bandwidths, wherein
in a cell having a system bandwidth wide enough to allow a random access channel from a user apparatus and an uplink shared data channel from another user apparatus to be frequency-division multiplexed in a same subframe, an uplink control channel unattached to the uplink shared data channel and the random access channel are frequency-division multiplexed in the same subframe, and
in a cell that does not have a system band wide enough to allow a random access channel from a user apparatus and an uplink shared data channel from another user apparatus to be frequency-division multiplexed in a same subframe, an uplink control channel unattached to the uplink shared data channel and the random access channel are time-division multiplexed, and the random access channel is transmitted for a transmission period of a downlink signal not being required to feed acknowledgement information indicative of positive acknowledgement or negative acknowledgement back to a base station apparatus.

2. A base station apparatus for use in a mobile communication system including multiple cells having different system bandwidths, the apparatus comprising:
a reception unit configured to receive a signal from a user apparatus;
a determination unit configured to determine whether the received signal includes a random access channel; and
a transmission unit configured to transmit a control signal to the user apparatus transmitting the random access channel, wherein
if a system bandwidth is not wide enough to allow a random access channel from a user apparatus and an uplink shared data channel from another user apparatus to be frequency-division multiplexed in a same subframe, a signal resulting in time-division multiplexing of an uplink control channel unattached to the uplink shared data channel and the random access channel is received in an uplink, and
the random access channel is transmitted for a transmission period of a downlink signal not being required to feed acknowledgement information indicative of positive acknowledgement or negative acknowledgement back to the base station apparatus.

3. A user apparatus for use in a mobile communication system including multiple cells having different system bandwidths, the apparatus comprising:
a reception unit configured to receive broadcast information;
a determination unit configured to determine which resource is allowed to transmit a random access channel based on the broadcast information; and
a transmission unit configured to transmit the random access channel, wherein
if a system bandwidth for a resident cell is not wide enough to allow a random access channel from a user apparatus and an uplink shared data channel from another user apparatus to be frequency-division multiplexed in a same subframe, a signal resulting in time-division multiplexing of an uplink control channel unattached to the uplink shared data channel and the random access channel is transmitted in an uplink, and the random access channel is transmitted for a transmission period of a downlink signal not being required to feed acknowledgement information indicative of positive acknowledgement or negative acknowledgement back to a base station apparatus.

4. A method for use in a mobile communication system including multiple cells having different system bandwidths, the method comprising:

transmitting information indicative of a resource to a user apparatus, the resource being allowed to transmit a random access channel; and transmitting the random access channel from the user apparatus to a base station apparatus, wherein if a system bandwidth for a resident cell is not wide enough to allow a random access channel from a user apparatus and an uplink shared data channel from another user apparatus to be frequency-division multiplexed in a same subframe, a signal resulting in time-division multiplexing of an uplink control channel unattached to the uplink shared data channel and the random access channel is transmitted in an uplink, and the random access channel is transmitted for a transmission period of a downlink signal not being required to feed acknowledgement information indicative of positive acknowledgement or negative acknowledgement back to the base station apparatus.

5. A mobile communication system including multiple cells having different system bandwidths, wherein in a cell having a system bandwidth wide enough to allow a random access channel from a user apparatus and an uplink shared data channel from another user apparatus to be frequency-division multiplexed in a same subframe, an uplink control channel unattached to the uplink shared data channel and the random access channel are frequency-division multiplexed in the same subframe, in a cell that does not have a system bandwidth wide enough to allow a random access channel from a user apparatus and an uplink shared data channel from another user apparatus to be frequency-division multiplexed in a same subframe, an uplink control channel unattached to the uplink shared data channel and the random access channel are frequency-division multiplexed, and a bandwidth scheduled for the random access channel in the cell having the system bandwidth not being wide enough is narrower than a bandwidth scheduled for the random access channel in the cell having the system bandwidth wide enough.

6. A base station apparatus for use in a mobile communication system including multiple cells having different system bandwidths, the apparatus comprising:

a reception unit configured to receive a signal from a user apparatus;

a determination unit configured to determine whether the received signal includes a random access channel; and a transmission unit configured to transmit a control signal to the user apparatus transmitting the random access channel, wherein if a system bandwidth is not wide enough to allow a random access channel from a user apparatus and an uplink shared data channel from another user apparatus to be frequency-division multiplexed in a same subframe, a signal resulting in frequency-division multiplexing of an uplink control channel unattached to the uplink shared data channel and the random access channel is received in an uplink, and a bandwidth scheduled for the random access channel in the cell having the system bandwidth not being wide enough is narrower than a bandwidth scheduled for the random access channel in the cell having the system bandwidth wide enough.

7. A user apparatus for use in a mobile communication system including multiple cells having different system bandwidths, the apparatus comprising:

a reception unit configured to receive broadcast information;

a determination unit configured to determine which resource is allowed to transmit a random access channel from the broadcast information; and a transmission unit configured to transmit the random access channel, wherein if a system bandwidth for a resident cell is not wide enough to allow a random access channel from a user apparatus and an uplink shared data channel from another user apparatus to be frequency-division multiplexed in a same subframe, a signal resulting in frequency-division multiplexing of an uplink control channel unattached to the uplink shared data channel and the random access channel is transmitted in an uplink, and a bandwidth scheduled for the random access channel in the cell having the system bandwidth not being wide enough is narrower than a bandwidth scheduled for the random access channel in the cell having the system bandwidth wide enough.

8. A method for use in a mobile communication system including multiple cells having different system bandwidths, the method comprising:

transmitting information indicative of a resource to a user apparatus, the resource being allowed to transmit a random access channel; and transmitting the random access channel from the user apparatus to a base station apparatus, wherein if a system bandwidth for a resident cell is not wide enough to allow a random access channel from a user apparatus and an uplink shared data channel from another user apparatus to be frequency-division multiplexed in a same subframe, a signal resulting in frequency-division multiplexing of an uplink control channel unattached to the uplink shared data channel and the random access channel is transmitted in an uplink, and a bandwidth scheduled for the random access channel in the cell having the system bandwidth not being wide enough is narrower than a bandwidth scheduled for the random access channel in the cell having the system bandwidth wide enough.

9. A base station apparatus for use in a mobile communication system including multiple cells having different system bandwidths, the apparatus comprising:

a reception unit configured to receive a signal from a user apparatus;

a determination unit configured to determine whether the received signal includes a random access channel; and a transmission unit configured to transmit a control signal to the user apparatus transmitting the random access channel, wherein if a system bandwidth is wide enough to allow a random access channel from a user apparatus and an uplink shared data channel from another user apparatus to be frequency-division multiplexed in a same subframe, an uplink control channel unattached to the uplink shared data channel and the random access channel are frequency-division multiplexed in the same subframe.

10. The base station apparatus as claimed in claim 9, wherein
a maximum bandwidth to be scheduled for the uplink control channel unattached to the uplink shared data channel is predefined depending on the system bandwidth, and
the random access channel is mapped to a band other than a band where the uplink control channel is allowed to be mapped.

11. The base station apparatus as claimed in claim 9, wherein in a predefined hopping period including multiple subframes, a frequency in a subframe to which the random access channel is allowed to be mapped is different from a frequency in another subframe to which the random access channel is allowed to be mapped.

12. The base station apparatus as claimed in claim 11, wherein if different scramble codes are applied to respective downlink signals transmitted at a predefined frequency for a predefined period in a cyclic manner, the hopping period is set to be equal to the predefined period.

13. The base station apparatus as claimed in claim 11, wherein a pattern in a cell of frequencies and time periods to which the random access channel is allowed to be mapped in the hopping period is temporally shifted from a pattern in another cell by a cyclic shift amount.

14. The base station apparatus as claimed in claim 13, wherein predefined correspondence among patterns of frequencies and time periods to which the random access channel is allowed to be mapped in the hopping period, system bandwidths and cyclic shift amounts is stored in a memory.

15. The base station apparatus as claimed in claim 13, wherein a number of subframes to which the random access channel is allowed to be mapped in the hopping period and the cyclic shift amount are transmitted to user apparatuses as broadcast information.

16. The base station apparatus as claimed in claim 9, wherein more frequency resources to which the random access channel is allowed to be mapped are provided for a wider system bandwidth.

17. A user apparatus for use in a mobile communication system including multiple cells having different system bandwidths, the apparatus comprising:
a reception unit configured to receive broadcast information;
a determination unit configured to determine which resource is allowed to transmit a random access channel based on the broadcast information; and
a transmission unit configured to transmit the random access channel, wherein
if a system bandwidth is wide enough to allow a random access channel from a user apparatus and an uplink shared data channel from another user apparatus to be frequency-division multiplexed in a same subframe, a signal resulting in frequency-division multiplexing of an uplink control channel unattached to the uplink shared data channel and a random access channel in the same subframe is transmitted.

18. A method for use in a mobile communication system including multiple cells having different system bandwidths, the method comprising:
transmitting information indicative of a resource to a user apparatus, the resource being allowed to transmit a random access channel; and
transmitting the random access channel from the user apparatus to a base station apparatus,
wherein if a system bandwidth is wide enough to allow a random access channel from a user apparatus and an uplink shared data channel from another user apparatus to be frequency-division multiplexed in a same subframe, a signal resulting in frequency-division multiplexing of an uplink control channel unattached to the uplink shared data channel and the random access channel in the same subframe is transmitted in an uplink.

* * * * *